United States Patent Office 3,143,389
Patented Aug. 4, 1964

3,143,389
MULTICOLOR RECORDING
Clifford D. Dransfield, Dallas, Tex., assignor to The Atlantic Refining Company, Philadelphia, Pa., a corporation of Pennsylvania
Filed Sept. 25, 1961, Ser. No. 140,438
11 Claims. (Cl. 346—109)

This invention relates to an improved device for recording amplitude varying signals in a given color code so the degree of amplitude variation is depicted by predetermined colors. More specifically, the invention relates to an improved seismic photographic recorder that aids record interpretation by recording with predetermined colors or shades of a given color to emphasize points of possible interest on the record.

Heretofore, single or multitrace recorders have used various types of recording methods to present information in a manner to aid record interpretation. For instance, in seismic exploration, seismic records are often printed in variable area or variable density form to emphasize reflections that indicate possible subsurface formations. In several instances, color recording has been resorted to to aid the interpreter. Van Dijck, 2,944,620, discloses one such method wherein the seismic signals are converted into a spectrum of frequencies and filtered to form selected bands which are recorded. The Van Dijck device utilizes a plurality of electronic circuits that control the intensity of filtered glow tubes, the outputs of which are combined to produce the desired color. Other devices utilize mirrors, prisms and screens to record signals in the desired manner.

While many devices are available for color recording none of them to date have provided a system that can record an amplitude varying signal according to a variable, predetermined color code or record both the negative and positive swings of the signal in the same color code to facilitate record interpretation.

The prior art recorders are not only limited in versatility; they are expensive, delicate and usually quite complicated. Although electronic color recorders are more expensive and complicated than the optical type recorders, even the optical recorders require expensive and accurately ground lenses, prisms and reflecting systems that are delicate and easy to knock out of adjustment.

Accordingly, the main object of this invention is to provide a simplified system which is capable of recording an amplitude varying signal in which a predetermined color code is used to aid record interpretation.

Another object of this invention is to provide a simplified and economical device which can be readily adapted to work with conventional photographic galvanometer-type recording systems to produce color records.

Another object of this invention is to provide an improved, simplified system capable of single or multitrace color recording.

Another object of this invention is to provide a system that can operate with any given color code and that can be switched from one code to another with a minimum of time and expense.

Another object of this invention is to provide a system that can record a plurality of traces simultaneously in the same color code or in different color codes.

Another object of this invention is to provide a system that can record both the positive and negative swings of the signal in the same color code.

Other objects and advantages of this invention will become apparent from the following description taken in conjunction with the accompanying drawings.

The preferred form of the instant invention is illustrated in the drawings wherein.

According to this invention, a color transparency displaying a desired color code is placed between a recording galvanometer and a color-sensitive film. When the galvanometer is in the no-signal condition, it reflects light through the zero or no-signal color band at the center of the transparency. As the galvanometer moves in response to a signal it oscillates in a direction perpendicular to the zero color band reflecting light through the various bands adjacent the center band and onto the film. The resulting multicolor trace is a reproduction of the received signal and various vertical segments of the signal are identified by predetermined colors. When a plurality of such signals are recorded in side-by-side relationship, such as in a seismogram, peaks and valleys of a given amplitude are emphasized by a particular color.

Figure 1:
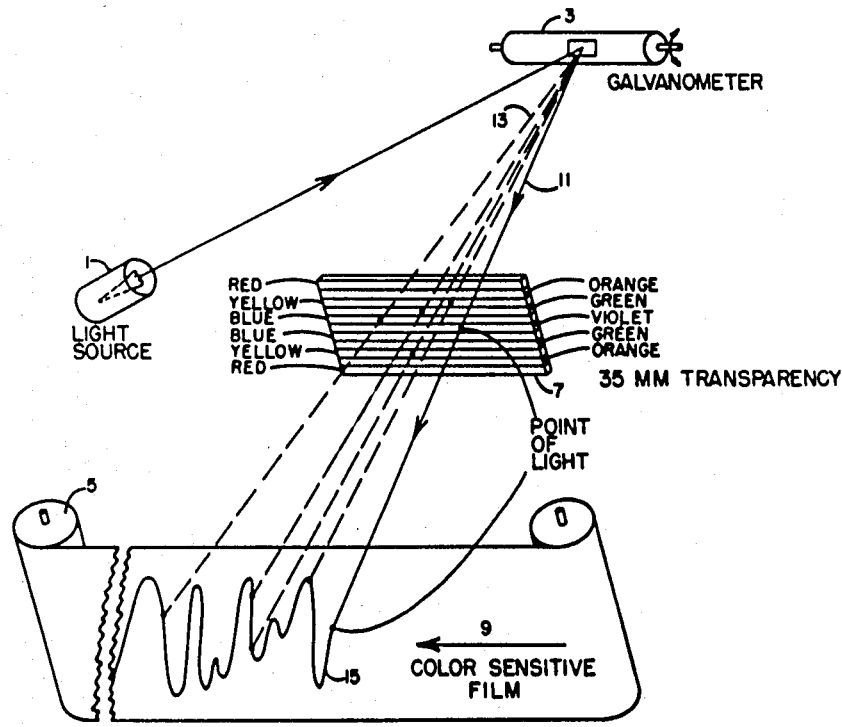
FIGURE 1 is a schematic diagram illustrating the principal elements of the present invention.

Refer now to the single trace, multicolor recorder shown in FIGURE 1. A conventional photographic type galvanometer recording system is shown employing light source 1, galvanometer 3 and recording drum system 5. A color transparency 7 to be described hereinafter, is positioned between galvanometer 3 and color-sensitive film 9 mounted on record support 5. In practice, film 9 would be enclosed in a conventional light tight container with a narrow slit type recording aperture; however, for purposes of illustration and in order to clearly show the recorded signal, the light box has been omitted.

Color transparency 7 can be made by using a Kodachrome film to photograph suitably arranged color bands. In addition, 7 can be made directly by arranging suitable color bands on transparent material that allows light to pass from the galvanometer onto the color-sensitive film 9. If desired, the color transparency can be made by suitably arranging bands of various shades of a predetermined color instead of using bands of different colors. Since the use of shades does not present the contrast offered by multicolor presentation, preparation of the transparency will be described using different color bands instead of shades. However, it should be understood that in either case the preparation of the transparency is basically the same.

The preferred method of constructing color transparency 7 involves painting a plurality of color bands on a suitable supporting medium such as art board and photographing the medium. Alternatively colored tape can be used instead of paint. A suitable color code is assigned to designate recorded signal amplitude variation. For example, a band of violet is painted on the center portion of the medium and blue bands are painted adjacent to and above and below the center band. Green bands are painted adjacent to and above and below the blue bands. Bands of yellow, orange and red are added in that order. The painted medium is then photographed and reduced in size to produce the desired color transparency on Kodachrome film. The width of each color band, the number of colors used and the arrangement of the colors are optional and depend upon the amount of amplitude variation in the signal, the amount of amplitude variation to be coded, the width of the final record and the portions of the signal that are of interest to the interpreter. The size of the color transparency itself is determined by the focal length of the recording system and the amount of amplitude variation recorded. In any event, if the color bands are painted it is desirable to make the original color code to a much larger scale than the final color transparency to facilitate accurate preparation of the bands. After the original code is completed, it is photographed on Kodachrome film and reduced to the proper size.

In operating the device as shown in FIGURE 1, color code 7, prepared as described above or in an equivalent manner, is positioned between conventional recording galvanometer 3 and a record transport system mounting color-sensitive film 9. The seismic or other signal to be recorded is fed to galvanometer 3 in a conventional manner causing it to move in accordance with the signal and reflect light from source 1 through transparency 7 onto color film 9. The movements of galvanometer 3 are essentially in the vertical plane as dictated by the amplitude varying seismic signal. For purposes of illustration, reflected light represented as solid line 11 is shown penetrating transparency 7 at the zero (violet) signal level onto color film 9. Dotted lines 13 are used to illustrate previous paths of light beam 11 through other color bands to record seismic signal 15 on film 9 according to color code 7. Although dotted lines 13 are shown out of the vertical plane, for purposes of illustration, it should be understood that the actual recording light line 11 always remains in the vertical plane and the record 9 imparts the only horizontal displacement by moving in the direction indicated by the arrow. A variation to the above can be accomplished by rotating transparency 7 by 90° or constructing a new 7 so that its color bands extend in a vertical direction. If this variation is used, the galvanometer is made to move in a direction perpendicular to the color band.

Figure 2:
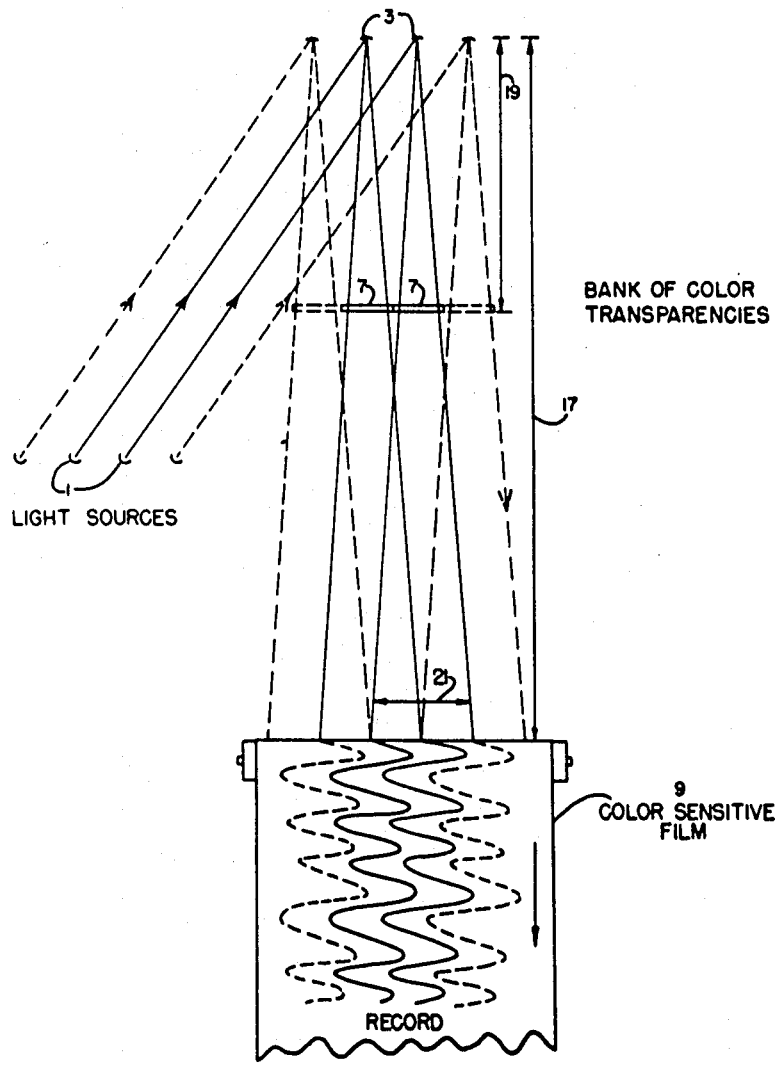
FIGURE 2 is a schematic diagram of the same apparatus recording a plurality of signals simultaneously.

In constructing a multitrace recorder, such as shown in FIGURE 2, the size of transparencies 7, distance 17 between 3 and 9, and distance 19 between 3 and 7 are not critical and can be varied according to the signals to be recorded and the purposes for which they are to be used. However, to reduce adjacent signal interference or crossover to the minimum, it is recommended that transparencies 7 be positioned between galvanometers 3 and record 9 so that the maximum amplitude swing 21 of each galvanometer on 9 equals twice the width of 7 and overlaps the maximum swing of its adjacent galvanometer by 50 percent as shown. With these limitations in mind, distances 17 and 19 are mainly determined by the size of the individual color transparency which in turn is made to accommodate the amplitude extremes of a particular signal to be recorded.

From the description it is clear that there are many variations and substitutions obvious to one skilled in the art in practicing this invention and that the subject invention is limited only by the appended claims.

I claim:
1. Apparatus for recording an amplitude varying signal in the form of a multicolored amplitude varying trace comprising
    (a) a light source,
    (b) a reflecting means for projecting a point of light and moving said point of light in accordance with the amplitude varying signal,
    (c) a color sensitive film, and
    (d) a color transparency containing two sets of similar color bands, each set of said bands occupying one-half of said transparency and arranged so that the color of any given point on the trace is indicative of the signal's amplitude deviation from the zero signal level at that point, said transparency located between said reflecting means and said color sensitive film.
2. In an apparatus as set forth in claim 1 wherein each of the bands in each set of bands is a different color.
3. In an apparatus as set forth in claim 1 wherein each of the bands in each set of bands is a different shade of a predetermined color.
4. In an apparatus as set forth in claim 1 wherein the bands extend along the transparency transverse to the reflecting mean's direction of movement.
5. In an apparatus as set forth in claim 1 wherein the reflecting means includes a galvanometer.
6. In an apparatus as set forth in claim 1 wherein the band located in the center of the transparency is common to the two sets of bands.
7. In an apparatus as set forth in claim 2 wherein wave lengths of the color bands in each set increase as a function of distance from center of the transparency.
8. In an apparatus as set forth in claim 2 wherein wave lengths of the color bands in each set decrease as a function of distance from center of the transparency.
9. In an apparatus as set forth in claim 3 wherein shades of the predetermined color in each set of bands increase as a function of distance from center of the transparency.
10. In an apparatus as set forth in claim 3 wherein the shades of the predetermined color in each set of bands decrease as a function of distance from center of the transparency.
11. An apparatus for simultaneously recording a plurality of amplitude varying signals in the form of multicolored amplitude varying traces comprising
    (a) a plurality of light sources,
    (b) a plurality of reflecting means for projecting a point of light and moving said point of light in accordance with one of the amplitude varying signals,
    (c) a color sensitive film, and
    (d) a plurality of color transparencies, each containing two sets of color bands, each of said sets occupying one-half of one of said transparencies and arranged so that the color of any given point on a trace is indicative of its signal's amplitude deviation from the zero signal level at that point, and said transparencies arranged in a plane parallel to said color sensitive film.

References Cited in the file of this patent
UNITED STATES PATENTS 2,944,620 Van Dijck _____ July 12, 1960
3,011,856 Palmer et al. _____ Dec. 5, 1961